US012054982B2

(12) United States Patent
Eisenbarth et al.

(10) Patent No.: US 12,054,982 B2
(45) Date of Patent: Aug. 6, 2024

(54) FENESTRATION FRAME WITH GLAZING STOP

(71) Applicant: Pella Corporation, Pella, IA (US)

(72) Inventors: Travis M. Eisenbarth, Pella, IA (US); Todd M. Leathers, Pella, IA (US); Jeremy Parr, Pella, IA (US)

(73) Assignee: Pella Corporation, Pella, IA (US)

( * ) Notice: Subject to any disclaimer, the term of this patent is extended or adjusted under 35 U.S.C. 154(b) by 0 days.

(21) Appl. No.: 18/313,566

(22) Filed: May 8, 2023

(65) Prior Publication Data

US 2023/0272666 A1 Aug. 31, 2023

Related U.S. Application Data

(63) Continuation of application No. 16/749,423, filed on Jan. 22, 2020, now Pat. No. 11,680,440.

(51) Int. Cl.
*E06B 3/26* (2006.01)
*E06B 3/54* (2006.01)

(52) U.S. Cl.
CPC ................ *E06B 3/26* (2013.01); *E06B 3/549* (2013.01)

(58) Field of Classification Search
CPC .... E06B 3/26; E06B 3/549; E06B 2003/6264; E06B 3/29
See application file for complete search history.

(56) References Cited

U.S. PATENT DOCUMENTS

| | | | | |
|---|---|---|---|---|
| 2,642,632 | A | 6/1953 | Savage | |
| 2,970,397 | A | 2/1961 | Roseman | |
| 3,064,320 | A * | 11/1962 | Blaszkowski | E06B 3/62 52/204.593 |
| 3,190,411 | A * | 6/1965 | Heinz | E06B 3/08 49/490.1 |
| 3,487,601 | A | 1/1970 | James | |
| 3,668,830 | A | 6/1972 | Frank et al. | |
| 3,803,779 | A | 4/1974 | Kuyper et al. | |
| 3,872,638 | A * | 3/1975 | Di Fazio | E06B 3/5828 52/204.593 |
| 3,982,371 | A | 9/1976 | Preu | |
| 4,132,044 | A | 1/1979 | Rollyson | |
| 4,133,367 | A | 1/1979 | Abell | |
| 4,154,033 | A | 5/1979 | Garofalo et al. | |
| 4,387,542 | A | 6/1983 | Wehr | |
| 4,897,975 | A | 2/1990 | Artwick et al. | |
| 5,139,846 | A | 8/1992 | Herwegh et al. | |
| 5,544,457 | A * | 8/1996 | Labrecque | E06B 3/5835 52/844 |
| 8,683,775 | B1 | 4/2014 | Jones | |
| 8,959,851 | B1 | 2/2015 | Cardinal | |

(Continued)

FOREIGN PATENT DOCUMENTS

| | | | |
|---|---|---|---|
| DE | 102004027281 | A1 | 1/2006 |
| DE | 202017101955 | U1 * | 8/2018 |

(Continued)

*Primary Examiner* — Christine T Cajilig
(74) *Attorney, Agent, or Firm* — FAEGRE DRINKER BIDDLE & REATH LLP

(57) ABSTRACT

Various aspects of the present disclosure are directed toward apparatuses, systems, and methods that include a fenestration unit. In certain instances, the fenestration units, and methods of re-glazing the fenestration units, described herein may be re-glazed from an interior space.

20 Claims, 7 Drawing Sheets

(56) References Cited

U.S. PATENT DOCUMENTS

| | | | | |
|---|---|---|---|---|
| 9,441,412 | B1 | 9/2016 | Hooper, Jr. et al. | |
| 9,752,375 | B2 | 9/2017 | Jones | |
| 10,233,689 | B1 * | 3/2019 | Jones | E06B 3/962 |
| 11,680,440 | B2 | 6/2023 | Eisenbarth et al. | |
| 2016/0201383 | A1 | 7/2016 | Lenox et al. | |
| 2016/0333633 | A1 * | 11/2016 | Carrick | E04C 2/38 |
| 2020/0032576 | A1 * | 1/2020 | Koster | E06B 1/702 |
| 2020/0232269 | A1 | 7/2020 | Eisenbarth et al. | |

FOREIGN PATENT DOCUMENTS

| | | | | |
|---|---|---|---|---|
| DE | 202017103278 | U1 | 9/2018 | |
| EP | 3667009 | A1 * | 6/2020 | |
| GB | 2209047 | A * | 4/1989 | E06B 3/62 |
| GB | 2225051 | A * | 5/1990 | E06B 3/5828 |

* cited by examiner

FENESTRATION FRAME WITH GLAZING STOP

CROSS REFERENCE TO RELATED APPLICATION

This application is a continuation of U.S. application Ser. No. 16/749,423, filed Jan. 22, 2020, which claims priority to Provisional Application No. 62/795,393, filed Jan. 22, 2019, which is herein incorporated by reference in its entirety.

TECHNICAL FIELD

Various aspects of the instant disclosure relate to fenestration products, such as doors and windows. In some specific examples, the disclosure concerns stationary windows such as picture windows.

BACKGROUND

Re-glazing of fenestration units may often occur from an exterior space. Re-glazing of fenestration units in this manner may be difficult given a height or location of the fenestration unit or environmental factors or conditions. This may lead to unsafe or expensive re-glazing.

It may be desirable, in certain instances, for fenestration units to be re-glazed in a safer and/or more effective manner.

SUMMARY

According to one example ("Example 1)") a fenestration unit includes a glazing unit having a peripheral edge region, a first side and a second side; a frame defining a head, a sill, a first jamb and a second jamb, the frame having a frame profile defining a first coupling element and an engagement face to which the first side of the glazing unit is releasably coupled; a glazing stop including a first coupling element and a first engagement face, wherein the first coupling element of the glazing stop is releasably coupled to the first coupling element of the frame, wherein the first engagement face of the glazing stop is releasably coupled to the second side of the glazing unit; a first sealing member disposed between the first side of the glazing unit and the engagement face of the frame; and a second sealing member disposed between the second side of the glazing unit and the first engagement face of the glazing stop.

According to another example ("Example 2"), further to the fenestration unit of Example 1, the fenestration unit also includes a cover and wherein the glazing stop includes a second coupling element, and the cover is coupled to the second coupling element of the glazing stop.

According to another example ("Example 3"), further to the fenestration unit of Example 2, the fenestration unit also includes a joining member configured to couple the glazing stop to the cover.

According to another example ("Example 4"), further to the fenestration unit of Example 3, the joining member is configured to frictionally engage the glazing stop to the cover and maintain coupling between the glazing stop to the cover.

According to another example ("Example 5"), further to the fenestration unit of Example 4, the joining member includes a first barbed portion configured to engage a channel in the glazing stop and a second barbed portion configured to engage a channel in the cover.

According to another example ("Example 6"), further to the fenestration unit of Example 2, the fenestration unit also includes a fastener configured to engage the glazing stop with the frame.

According to another example ("Example 7"), further to the fenestration unit of Example 6, the cover is coupled to the frame and is configured to shield the glazing stop and fastener from observation.

According to another example ("Example 8"), further to the fenestration unit of Example 1, the first sealing member is adhesively coupled to the engagement surface of the frame and non-adhesively coupled to the first side of the glazing unit.

According to another example ("Example 9"), further to the fenestration unit of Example 8, the second sealing member is adhesively coupled to the second side of the glazing unit and the first engagement face of the glazing stop.

According to another example ("Example 10"), further to the fenestration unit of Example 9, the first sealing member and the second sealing member comprise foam and are at least one of air-permeable and moisture-blocking.

According to another example ("Example 11"), further to the fenestration unit of Example 10, the fenestration unit also includes a third sealing member disposed between the frame and the glazing stop.

According to another example ("Example 12"), further to the fenestration unit of Example 11, the third sealing member is adhesively coupled to the glazing stop and non-adhesively coupled to the frame.

According to another example ("Example 13"), further to the fenestration unit of Example 1, the frame defines one or more weep holes configured to guide fluid within the fenestration unit from the fenestration unit to the exterior space.

According to one example ("Example 14"), a fenestration unit defining a boundary between an interior space and an exterior space includes a glazing unit having a peripheral edge region, a first side and a second side; a frame defining a head, a sill, a first jamb and a second jamb, the frame having a frame profile defining a first coupling element and an engagement face to which the first side of the glazing unit is releasably coupled; a glazing stop including a first coupling element and a first engagement face, wherein the first coupling element of the glazing stop is releasably coupled to the first coupling element of the frame, wherein the first engagement face of the glazing stop is releasably coupled to the second side of the glazing unit and removable from the interior space; a first sealing member disposed between the first side of the glazing unit and the engagement face of the frame; and a second sealing member disposed between the second side of the glazing unit and the first engagement face of the glazing stop and removable from the interior space.

According to another example ("Example 15"), further to the fenestration unit of Example 14, the fenestration unit also includes a fastener configured to engage the glazing stop with the frame and a cover coupled to the frame and configured to shield the glazing stop and fastener from observation.

According to another example ("Example 16"), further to the fenestration unit of Example 15, the cover, the fastener, the second sealing member, the glazing stop, and the glazing unit are removable from the interior space.

According to one example ("Example 17"), a method of re-glazing a fenestration unit defining a boundary between an interior space and an exterior space includes accessing a glazing unit arranged within a frame, the glazing unit having a peripheral edge region, a first side and a second side and the frame defining a head, a sill, a first jamb and a second jamb, the frame having a frame profile defining a first coupling element and an engagement face to which the first side of the glazing unit is releasably coupled and a first sealing member disposed between the first side of the glazing unit and the engagement face of the frame; removing a glazing stop from the interior space, the glazing stop including a first coupling element and a first engagement face, wherein the first coupling element of the glazing stop is releasably coupled to the first coupling element of the frame, wherein the first engagement face of the glazing stop is releasably coupled to the second side of the glazing unit; and removing a second sealing member from the interior space, the second sealing member being disposed between the second side of the glazing unit and the first engagement face of the glazing stop and from the interior space.

According to another example ("Example 18"), further to the method of Example 17, accessing the glazing unit includes removing a cover coupled to the frame.

According to another example ("Example 19"), further to the method of Example 18, the method also includes a fastener configured to engage the glazing stop with the frame and the cover is configured to shield the glazing stop and fastener from observation.

According to another example ("Example 20"), further to the method of Example 19, the cover, the fastener, the second sealing member, the glazing stop, and the glazing unit are removable from the interior space.

While multiple inventive examples are specifically disclosed, various modifications and combinations of features from those examples will become apparent to those skilled in the art from the following detailed description. Accordingly, the disclosed examples are meant to be regarded as illustrative in nature and not restrictive.

Figure 1:
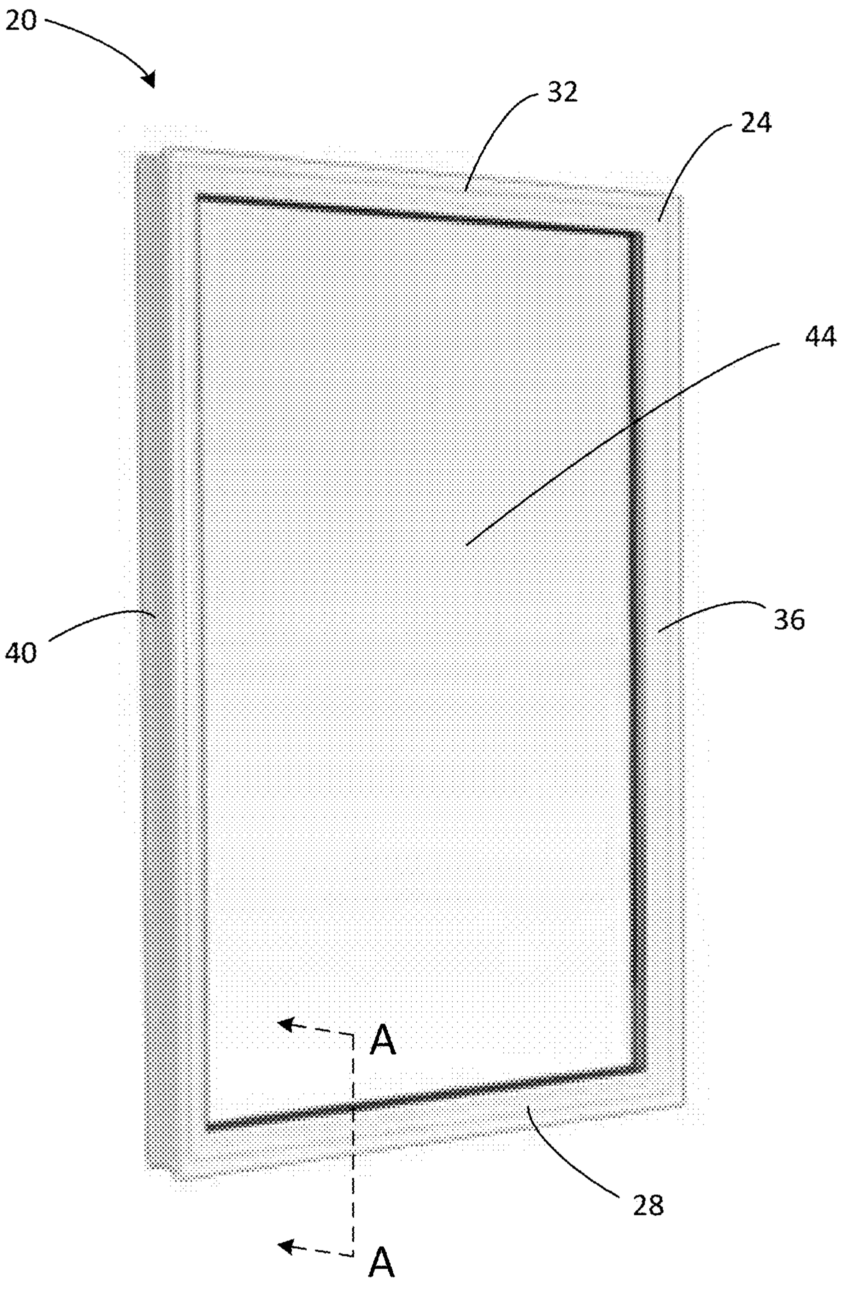
FIG. 1 shows a fenestration unit, according to some examples.

The components of the fenestration units may have common elements which may be referred to by the same reference numbers throughout the disclosure. While the disclosure is amenable to various modifications and alternative forms, specific embodiments have been shown by way of example in the drawings and are described in detail below. The disclosure, however, is not limited to the particular embodiments described. On the contrary, the disclosure is intended to cover all modifications, equivalents, and alternatives falling within the scope of the disclosure as defined by the appended claims.

DETAILED DESCRIPTION

Various aspects of the present disclosure are directed toward apparatuses, systems, and methods that facilitate re-glazing of fenestration units. In certain instances, the fenestration units, and methods of re-glazing the fenestration units, described herein may be re-glazed from an interior space rather than an exterior space as is certain prior fenestration units. The fenestration units may be arranged within buildings, such as multilevel buildings. The fenestration units, consistent with various aspects of the present disclosure, may facilitate reduced time, cost, and lessen safety risk of re-glazing fenestration units.

FIG. 1 shows a fenestration unit 20, according to some examples. The fenestration unit 20 includes a frame 24 and a glazing unit 44 supported by the frame 24. The frame 24 includes a sill member 28, a head member 32, a first jamb member 36, and a second jamb member 40. The fenestration unit 20 may define a boundary between an interior space and an exterior space. In various examples, the fenestration unit 20 is a stationary, or fixed fenestration unit (e.g., a picture window). In other instances, the fenestration unit 20 is an operative, or venting fenestration unit (e.g., a double hung, casement, or awning window). In some instances, when the fenestration unit 20 is a venting fenestration unit, the frame 24 is a venting frame (e.g., the frame 24 corresponds to a sash or venting panel) that is moveably coupled to a stationary frame configured to be received by a rough opening (e.g., of a building).

Figure 2:
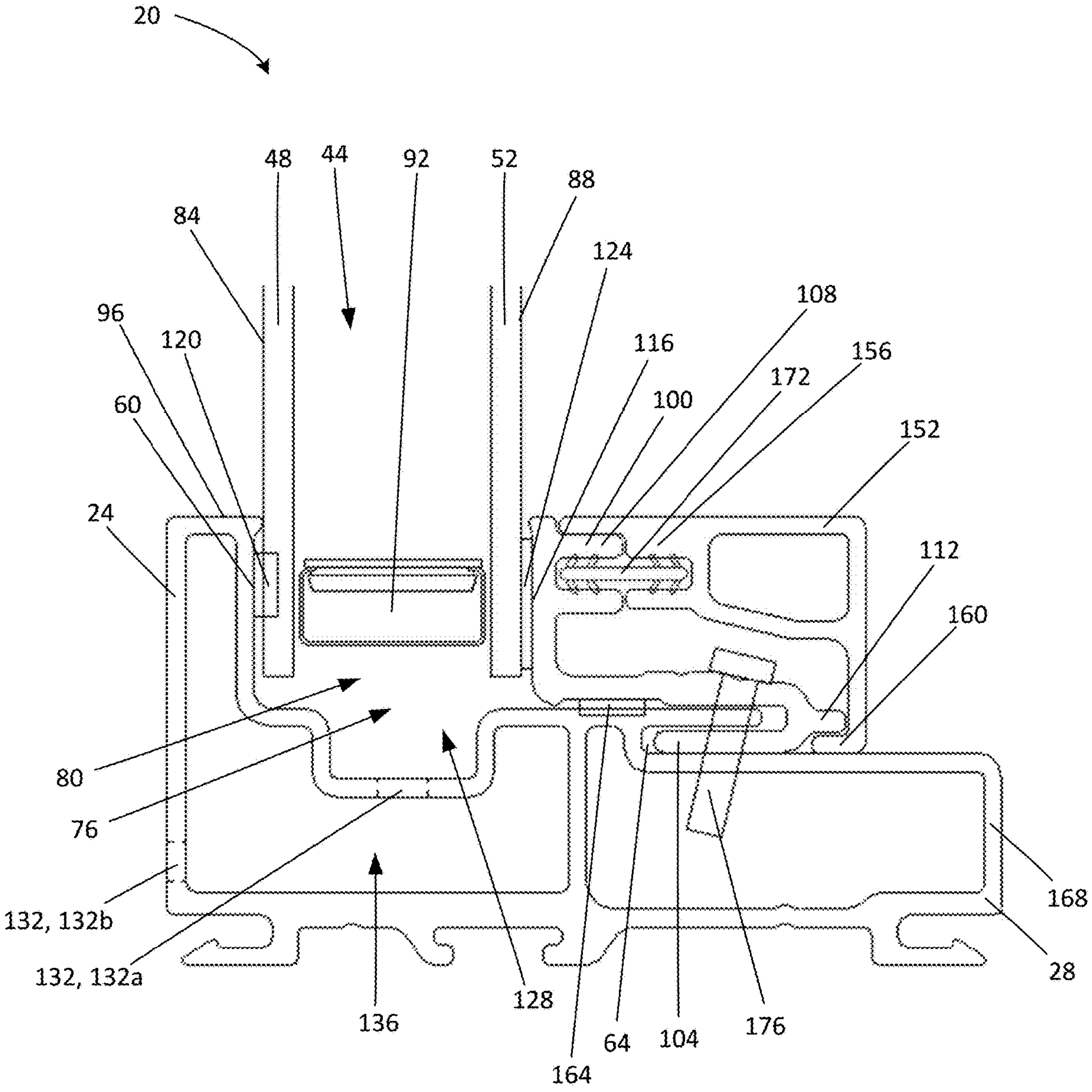
FIG. 2 shows a cross-sectional view (section A-A) of the fenestration unit of FIG. 1 including a glazing stop, according to some examples.

FIG. 2 shows a cross-sectional view (section A-A) of the fenestration unit 20 including a glazing stop 100, according to some examples. The fenestration unit 20 includes the frame 24, the glazing unit 44, the glazing stop 100, and a cover 152. In certain instances, the frame 24 includes a first frame section 96, a second frame section 168, an engagement face 60, and a glazing unit receptacle 76. The first frame section 96 may be near the exterior space and the second frame section 168 may be near the interior space.

As shown in FIG. 2, the glazing unit 44 includes a first pane 48, a second pane 52, and a spacer 92. In various examples, the glazing unit 44 has a first surface, face, or side 84, a second surface, face, or side 88, and a peripheral edge region 80. In some instances, the first side 84 is an exterior facing side of the first pane 48 and/or of the glazing unit 44, and the second side 88 is the interior facing side of the second pane 52 and/or of the glazing unit. In various examples, the peripheral edge region 80 is configured to be coupled and/or secured to the frame 24, such as by the glazing stop 100 and the engagement face 60 of the frame.

When the fenestration unit 20 is glazed, the first side 84 of the glazing unit 44 is coupled to an engagement face 60 of the frame 24 and the second side 88 of the glazing unit is coupled to the glazing stop 100. In some instances, the glazing unit 44 is configured to be received by the frame 24 in the glazing unit receptacle 76 such that the peripheral edge region 80 is aligned with the peripheral channel 128.

In certain instances, the engagement face 60 is part of the first frame section 96 with the engagement face 60 being configured to engage or be coupled to the glazing unit 44. A first sealing member 120 may be arranged at or adjacent to the engagement face 60. In certain instances, the first sealing member 120 couples (e.g., adhesively and/or releasably) the glazing unit 44 (e.g., the first pane 48) to the frame 24 (e.g., at the engagement face 60). In other instances, the first sealing member 120 may be a single sided adhesive structure. For example, the first sealing member 120 may include an adhesive side configured to contact the frame 24 (e.g., the engagement face 60) and a non-adhesive side configured to contact the glazing unit 44 (e.g., the first pane 48) such that the glazing unit 44 is removable (e.g., during re-glazing of the fenestration unit 20) from the interior space without accessing the first sealing member 120 (e.g., for cutting) as is explained in further detail below. In certain instances, the first sealing member 120 may include foam. In addition, the first sealing member 120 may be air-permeable and/or moisture-blocking. The first sealing member 120 having a surface that does not adhere to and contacts the first pane 48 facilitates re-glazing of the fenestration unit 20 from an interior side of the unit 20.

The fenestration unit 20 may also include a second sealing member 124. As shown in FIG. 2, the second sealing member 124 couples (e.g., adhesively and/or releasably) the glazing unit 44 (e.g., the second pane 52) to the glazing stop 100 (e.g., the first engagement face 116). In certain instances, the second sealing member 124 adheres to the second pane 52 and the glazing stop 100. The second sealing member 124, in these instances, may be double sided adhesive tape. In other instances, the second sealing member 124 may be single sided adhesive.

In some examples, the fenestration unit 20 may also include a third sealing member 164 configured to be removed to decouple the glazing stop 100 from the glazing unit 44 and/or the frame 24. The third sealing member 164 may be single sided adhesive. In addition, and as shown in FIG. 2, the third sealing member 164 couples (e.g., adhesively and/or releasably) the glazing stop 100 to the frame 24. Similar to the first sealing member 120, the third sealing member 164 may include a foam material and may be air-permeable and/or moisture-blocking. In addition, the third sealing member 164 having a single side that adheres, or being a single sided adhesive tape, facilitates re-glazing of the fenestration unit 20 from an interior side of the unit 20. The third sealing member 164 may adhere to the frame 24 with the foam or non-adhering side contacting the glazing stop 100.

In various instances, the glazing stop 100 of the fenestration unit 20 is configured to retain, secure, or hold the glazing unit 44 coupled to the frame 24 when the fenestration unit is glazed. In some examples, the glazing stop 100 defines a first coupling element 104, a second coupling element 108, a third coupling element 112, and a first engagement face 116. In some examples, the first coupling element 104 is configured to be coupled to the frame 24, such as to the first coupling element 64. The first coupling element 104 can include a channel, a recess, a hook, a post, and/or a protrusion. In various examples, the second coupling element 108 and the third coupling element 112 are configured to be coupled to the cover 152 and can include a channel, a recess, a hook, a post, and/or a protrusion. In some instances, the first engagement face 116 is configured to engage or be coupled to the glazing unit 44 (e.g., the second side 88 and/or the second pane 52) when the fenestration unit 20 is glazed. The glazing stop 100 and/or the frame 24 may include a metal (e.g., aluminum), a polymeric material (e.g., vinyl), and/or a composite material (e.g., such as the fiberglass material sold by Pella Corporation under the trade name, "DURACAST").

In some instances, the fenestration unit 20 further includes a fastener 176 configured to secure the glazing stop 100 to the frame 24 (e.g., the second frame section 168) such that decoupling the glazing stop 100 from the frame 24 includes removing the fastener 176. In some examples, the fastener 176 is shielded (from view) by the cover 152. In certain instances, the third coupling element 112 is configured to position the fastener 176 at a depth and stop penetration of the fastener 176 into the frame 24.

The cover 152 of the fenestration unit 20 may be configured to be coupled to the glazing stop 100 and/or the frame 24 and includes a first end 156 and a second end 160. As shown in FIG. 2, each of the first end 156 and the second end 160 includes a coupling element (e.g., a channel, a recess, a hook, a post, and/or a protrusion) and is configured to be coupled to the glazing stop 100. For example, the first end 156 is configured to be coupled to the second coupling element 108 and the second end 160 is configured to be coupled to the third coupling element 112. In some instances, the fenestration unit 20 includes a joining member 172 (e.g., a double-sided, flexible barbed member) configured to join the glazing stop 100 and the cover 152, such as to join the second coupling element 108 and the first end 156. In various examples, the cover 152 shields the glazing stop 100 from observation (e.g., of a user), such as from the interior space. In certain instances, the cover 152 includes a polymeric material (e.g., PVC, polyurethane-based fiberglass, or polypropylene).

The joining member 172 holds the cover 152 to the glazing stop 100. Force may be applied to the cover 152 to remove the cover 152 from the glazing stop 100. As shown in FIG. 2, the joining member 172 may be barbed on both ends. The barbed joining member 172 facilitates maintaining the cover 152 coupled to the glazing stop 100 by holding the cover 152 in contact with the glazing stop 100.

In some examples, the frame, the glazing stop, a glazing retainer, and/or the cover of the fenestration unit according to the instant disclosure, include PVC, ABS, Polypropylene, ASA, polycarbonate, aluminum, DURACAST, galvanized steel, stainless steel, fiberglass, copper, or other material as desired. In various examples, the third sealing member 164 includes dry sealant bead, weather-strip bulb, and/or adhesive tape.

In some examples, the glazing unit receptacle 76 is defined by the first frame section 96, such as next to the engagement face 60. The peripheral channel 128 may be arranged adjacent to (e.g., below) the glazing unit receptacle 76 and configured to guide or drain fluid (e.g., water) near the glazing unit 44 to exit the frame 24 via the one or more weep holes 132. In various examples, the one or more weep holes 132 or openings are defined by the frame 24 (e.g., by the first frame section 96) and are configured to fluidically couple the peripheral channel 128 to the exterior space.

In various instances, the one or more weep holes 132 include a first weep hole **132*a* connected (e.g., fluidically) to the peripheral channel 128 and a second weep hole 132*b* connected (e.g., fluidically) to the exterior space. For example, the first weep hole 132*a* is positioned below the peripheral channel 128 and the second weep hole 132*b* is positioned below the first weep hole 132*a* such that fluid flows downwards from the peripheral channel via the first weep hole 132*a* and the second weep hole 132*b* to exit the frame 24 and into the exterior space. In some examples, the first frame section 96 further defines a first chamber 136 that is fluidically coupled to the peripheral channel 128 (e.g., via the first weep hole 132*a*) and to the exterior space (e.g., via the second weep hole 132*b*). In various examples, the first coupling element 64 is defined by the frame 24 at the second frame section 168 and configured to hold, retain, secure, engage, and/or be coupled to the glazing stop 100. In some examples, the first coupling element 64** includes a channel, a recess, a hook, a post, and/or a protrusion.

In re-glazing, the cover 152 may be removed to access the frame 24. Force may be applied to the cover 152 to overcome the friction fit of the joining member 172 holding the cover 152 to the glazing stop 100. After the cover 152 is removed, the glazing stop 100 may be exposed. The cover 152 being removed provides access to fastener 176 and sealing member 124 from an interior space. In certain instances, removing fastener 176 physically decouples glazing stop 100 from frame engagement surface 60. The sealing members 120, 124, 164 hold and seal the panes 48, 52 within the frame 24. Physically (e.g., via a cutter) and/or chemically (e.g., via a releasing agent such as acetone or heat) removing sealing member 124 decouples stop 100 from interior glass surface 88. Sealing members 120, 164 being formed of a single sided adhesive facilitates removal of glazing stop 100 and glazing unit 44 without cutting of sealing members 120, 164.

After glazing stop 100 is removed (as well as the sealing members 124, 164), the glazing unit 44 may be removed from the receptacle 76 of the frame 24 with the glazing unit 44 decoupled from sealing member 120.

In various examples, installing the replacement glazing unit includes positioning the replacement glazing unit 44 in the glazing unit receptacle 76 and/or coupling the glazing unit 44 to the non-adhesive surface of sealing member 120. Sealing members 120, 124, 164 may be applied by placing (e.g., single- or double-sided adhesive tape as described above), dispensing, spraying, or depositing the sealing member or its precursor followed by optional curing of the sealing member or its precursor. The glazing stop 100 may be reinstalled by coupling the glazing stop coupling element 104 with the frame 24.

In some examples, installing the fastener 176 includes arranging the fastener 176 through the glazing stop 100 and into the frame 24 by rotating and/or extending the fastener 176 through one or more fastener openings of the glazing stop 100 and the frame 24. The cover 152 may be reinstalled by coupling the cover 152 to glazing stop 100 using joining member 172.

Figure 3:
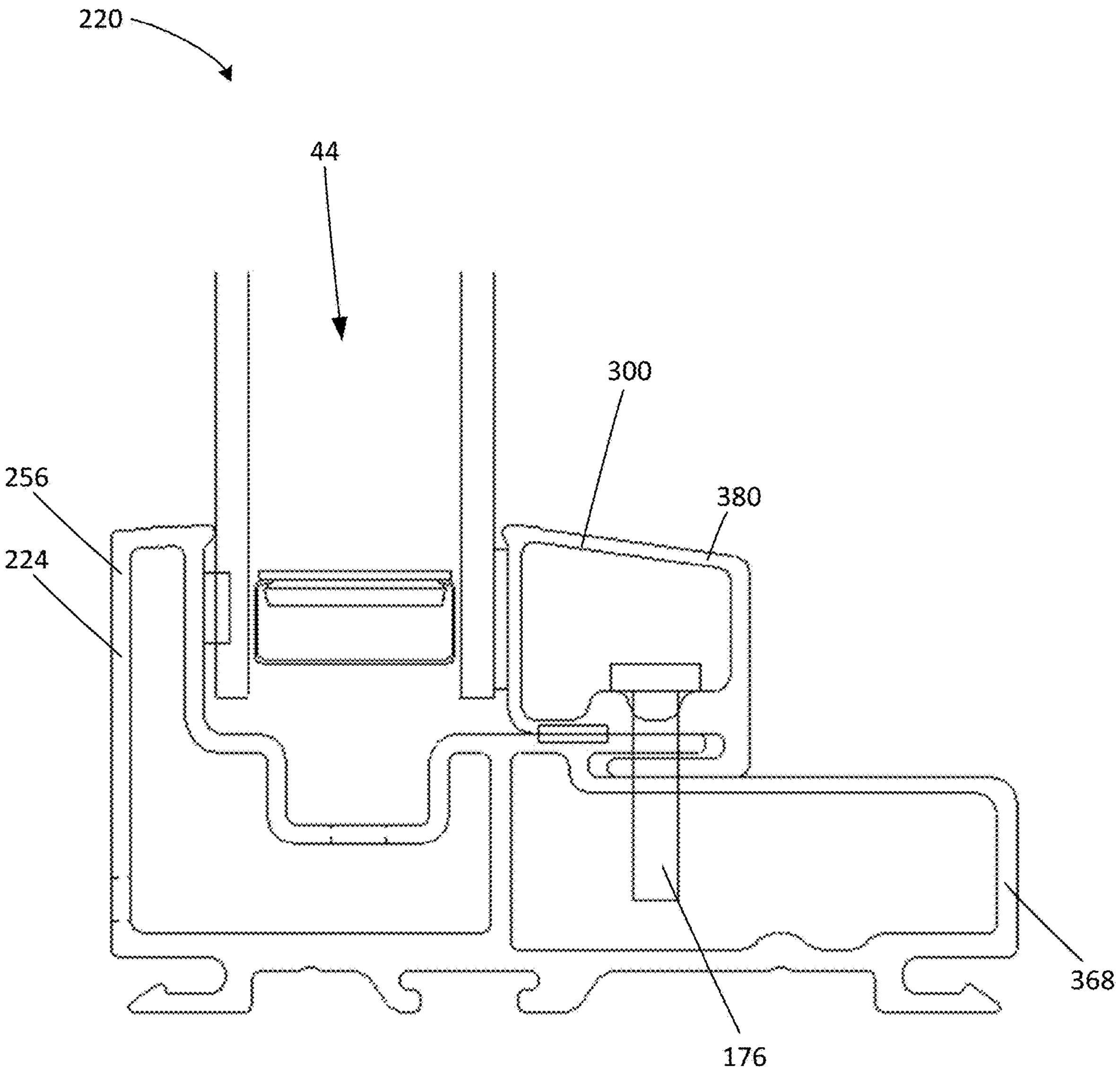
FIG. 3 shows a cross-sectional view of another fenestration unit including a glazing stop, according to some examples.

FIG. 3 shows a cross-sectional view of another fenestration unit 220 including a glazing stop 300, which may be substantially similar to the fenestration unit 20 other than the features noted below. As shown, the fenestration unit 220 includes a frame 224 having a frame profile 256 defining a second profile section 368, a glazing unit 44, and the glazing stop 300 configured to secure the glazing unit to the frame. The fenestration unit 220 further includes a fastener 176 configured to secure the glazing stop 300 to the frame 224, such as to the second profile section 368.

The fastener 176 may be substantially shielded from observation by a shielding portion 380 of the glazing stop 300. In some examples, the glazing stop 300 defines one or more openings and each optionally having a cover through which the fastener 176 is accessible for installation. The glazing stop 300 is configured to additional cover and shield internal components of the fenestration unit 220 from observation.

Figure 4:
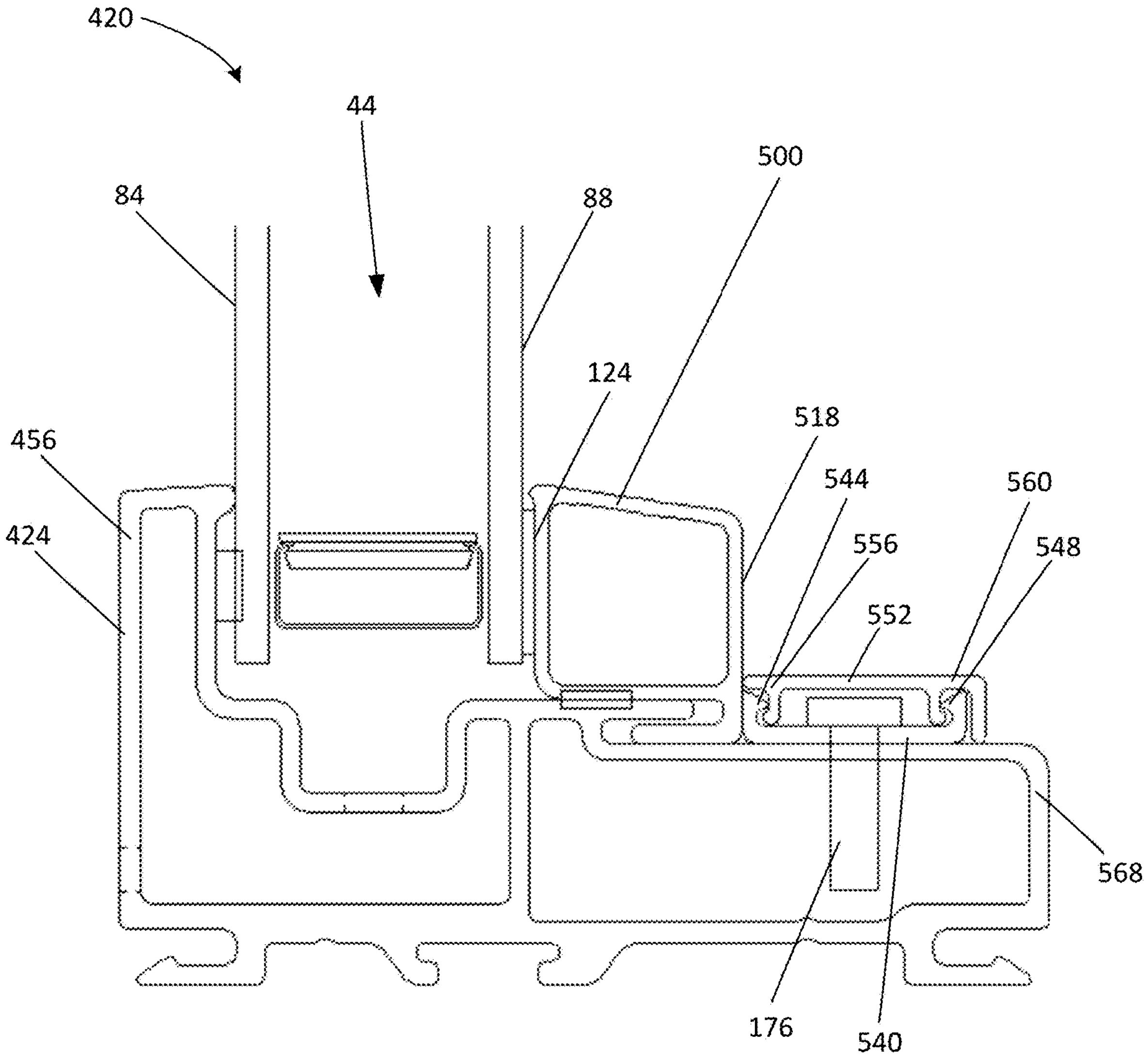
FIG. 4 shows a cross-sectional view of another fenestration unit including a glazing stop, according to some examples.

FIG. 4 shows a cross-sectional view of another fenestration unit 420 including a glazing stop 500. As shown, the fenestration unit 420 includes a frame 424 having a frame profile 456 defining a second profile section 568, a glazing unit 44, and the glazing stop 500 configured to secure the glazing unit to the frame. The fenestration unit 420 further includes a glazing retainer 540 and a cover 552. The glazing retainer 540 includes a first end 544 and a second end 548; the cover 552 includes a first end 556 and a second end 560.

In various examples, the glazing retainer 540 is configured to be secured to the frame 424, such as to the second profile section 568 via a fastener 176, to secure the glazing stop 500 to the frame 424. For example, the glazing retainer 540 (e.g., the first end 544) is configured to engage the glazing stop 500 (e.g., a second engagement face 518) when the glazing stop and the glazing retainer are secured to the frame 424. In some instances, the cover 552 is configured to be coupled to the glazing retainer 540 such that the fastener 176 is shielded from observation. For example, the first end 556 of the cover 552 is configured to be coupled to the first end 544 of the glazing retainer 540; the second end 560 of the cover 552 is configured to be coupled to the second end 548 of the glazing retainer 540. In some examples, one or more of the ends 544, 548 556, 560 include a coupling element (e.g., a channel, a recess, a hook, a post, and/or a protrusion).

Figure 5:
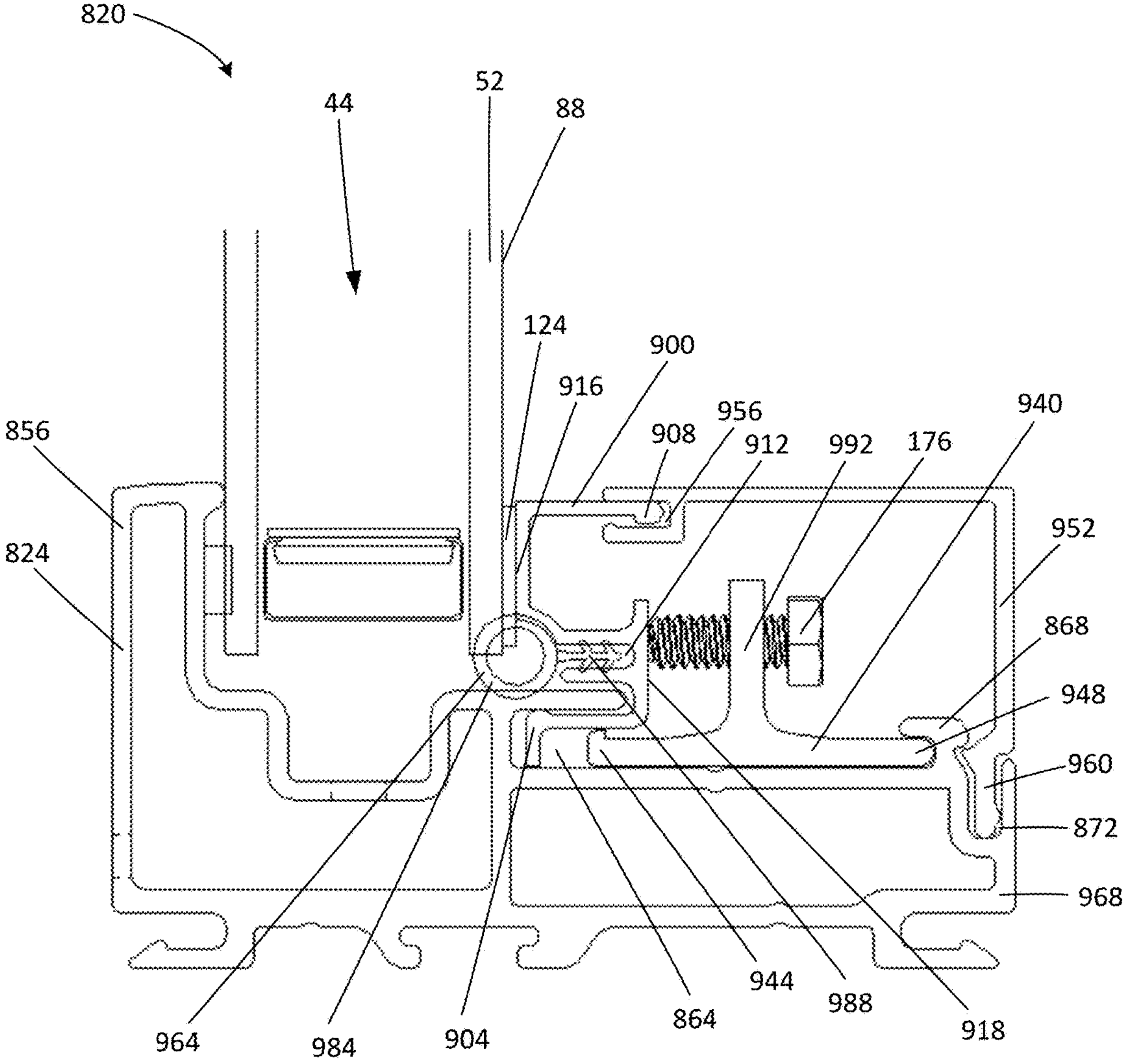
FIG. 5 shows a cross-sectional view of another fenestration unit including a glazing stop, according to some examples.

FIG. 5 shows a cross-sectional view of another fenestration unit 820 including a glazing stop 900, which may be substantially similar to fenestration unit 20, other than the features noted below. As shown, the fenestration unit 820 includes a frame 824 having a frame profile 856 defining a second profile section 968, a glazing unit 44, the glazing stop 900, a glazing retainer 940, a cover 952, a fastener 176, and a third sealing member 964. In various examples, the frame 824 defines a first coupling element 864 to which the glazing stop 900 is configured to be coupled, a second coupling element 868 to which the glazing retainer 940 is configured to be coupled, and a third coupling element 872 to which the cover 952 is configured to be coupled. One or more of the coupling elements 864, 868, 872 are defined by the frame 824 at the second profile section 968. For example, the third coupling element 872 is nearest to the interior space and the first coupling element 864 is nearest to the exterior space.

In some examples, the glazing stop 900 includes a first coupling element 904, a second coupling element 908, a third coupling element 912, a first engagement face 916, and a second engagement face 918. In various examples, the glazing stop 900 is configured to couple or secure the glazing unit 44 to the frame 824. For example, the first coupling element 904 of the glazing stop 900 is configured to be coupled to the first coupling element 864 of the frame 824 such that when coupled, the first engagement face 916 of the glazing stop 900 engages the glazing unit 44 (e.g., the second pane 52 and/or the second side 88), such as via a second sealing member 124. In some examples, the second coupling element 908 is configured to be coupled to the cover 952, the third coupling element 912 is configured to be coupled to the third sealing member 964, and/or the second engagement face 918 is configured to be engaged to the fastener 176 when the fenestration unit 820 is glazed.

In various examples, the glazing retainer 940 has a first end 944, a second end 948, and a fastener stand 992. In various examples, the first end 944 is configured to be near the glazing stop 900, such as slideably positioned between the glazing stop and the frame 824. In some examples, the second end 948 of the glazing retainer 940 is configured to engage and/or be secured to the frame 824, such as by the second coupling element 868. In certain examples, the fastener stand 992 is configured to receive the fastener 176. For example, the fastener stand 992 includes a tapped through-hole through which the fastener 176 can be threaded. In the illustrated example, the fastener 176 coupled to the fastener stand 992 is positioned to engage the glazing stop 900 to secure the glazing stop to the frame 824.

For example, the fastener 176 is positioned to engage the second engagement face 918 to apply a securement force to the glazing stop 900. In some examples, the securement force is adjustable via controlling the travel of the fastener 176 (e.g., via rotating the fastener) relative to the fastener stand 992 of the glazing retainer 940. In certain examples, the second end 948 of the glazing retainer 940 is secured to the frame 824 (e.g., by the second coupling element 868) by the securement force.

In some examples, the cover 952 includes a first end 956 configured to be coupled to the glazing stop 900 and a second end 960 configured to be coupled to the frame 824. For example, the first end 956 is configured to be coupled to the second coupling element 908 of the glazing stop 900 and the second end 960 is configured to be coupled to the third coupling element 872 of the frame 824. In some examples, one or more of the coupling elements 864, 868, 872, 904, 908, 912 and/or one or more of the ends 944, 948 956, 960 include a channel, a recess, a hook, a post, and/or a protrusion. In various examples, the cover 952 is configured to be snap-fitted to the frame 824 and/or the glazing stop 900. In certain examples, the cover 952 shields the glazing retainer 940 and/or the fastener 176 from observation.

Figure 6:
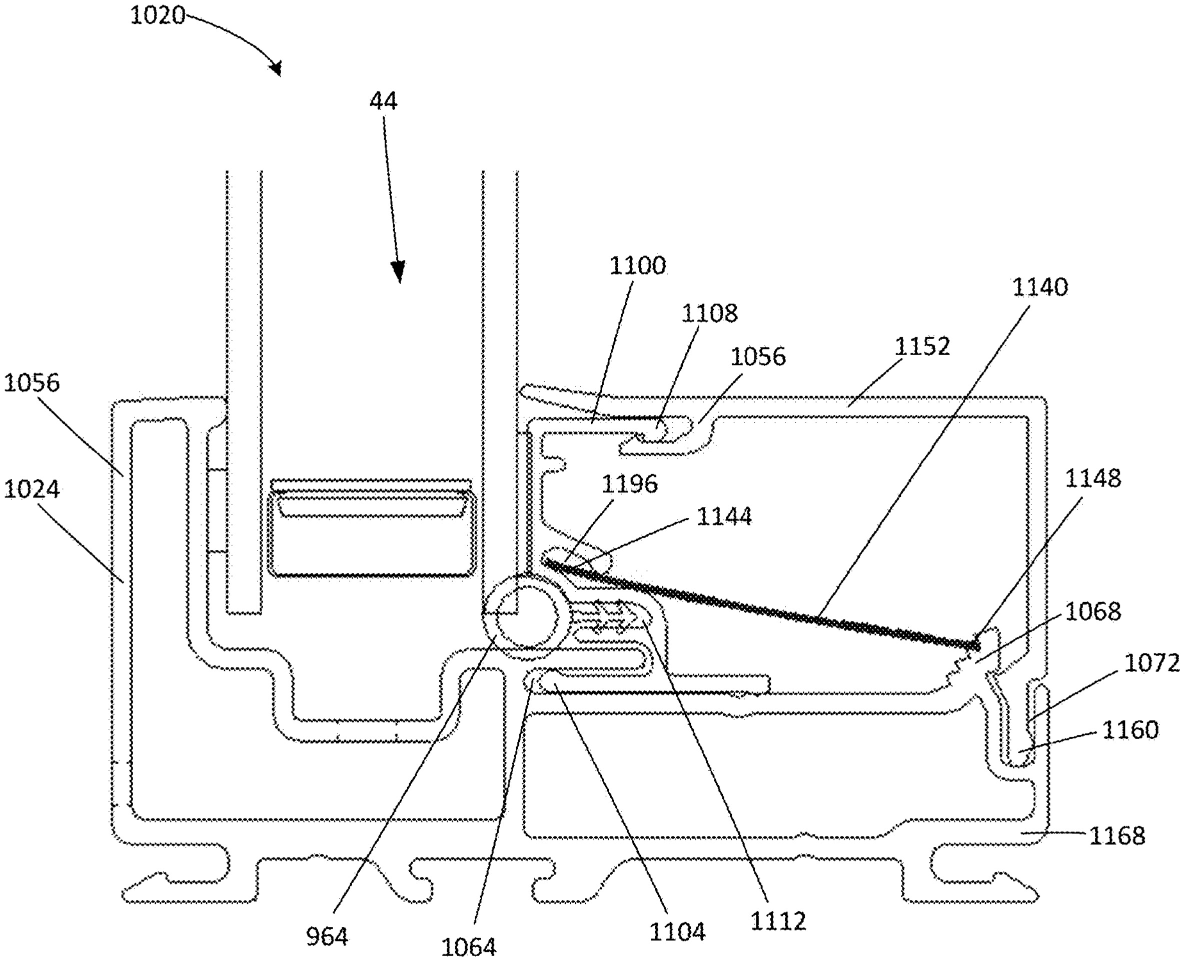
FIG. 6 shows a cross-sectional view of another fenestration unit including a glazing stop, according to some examples.

In various examples, the third sealing member 964 includes a sealing portion 984 and a securing portion 988. As shown in FIG. 6, the sealing portion 984 is configured to engage the glazing unit 44 and the frame 824 and/or to seal a gap between the glazing unit and the frame. As illustrated, the securing portion 988 is configured to be coupled (e.g., received by) to the glazing stop 900, such as to the third coupling element 912. In some examples, the sealing member 964 or portions thereof includes a compliant, or elastomeric material (e.g., rubber). In certain examples, the sealing portion 984 is cylindrical and/or the securing portion 988 is barbed.

FIG. 6 shows a cross-sectional view of another fenestration unit 1020 including a glazing stop 1100, which may be substantially similar to fenestration unit 820, other than the features noted below. As shown, the fenestration unit 1020 includes a frame 1024 having a frame profile 1056 defining a second profile section 1168, a glazing unit 44, the glazing stop 1100, a glazing retainer 1140, and a cover 1152. In various examples, the frame 1024 defines a first coupling element 1064 configured to secure the glazing stop 1100, a second coupling element 1068 configured to secure the glazing retainer 1140, and a third coupling element 1072 configured to secure the cover 1152. In some examples, the second coupling element 1068 includes a stepped, barbed, or patterned surface. In some examples, the glazing stop 1100 defines a first coupling element 1104 configured to be coupled to the frame 1024, a second coupling element 1108 configured to be coupled to the cover 1152, a third coupling element 1112 configured to secure a third sealing member 964, and a fourth coupling element 1196 configured to secure the glazing retainer 1140. For example, the first coupling element 1104 of the glazing stop 1100 is configured to be coupled to the first coupling element 1064 of the frame 1024. In certain examples, the glazing retainer 1140 has a first end 1144 and a second end 1148.

As shown in FIG. 6, the first end 1144 of the glazing retainer 1140 is configured to engage and/or be secured to the glazing stop 1100, such as by the fourth coupling element 1196. As illustrated, the second end 1148 is configured to engage and/or be secured to the frame 1024, such as by the second coupling element 1068. In various examples, when secured to the frame 1024, the glazing retainer 1140 urges the glazing stop 1100 towards the glazing unit 44 to secure the glazing unit. In some examples, the glazing retainer 1140 includes metal. In various examples, the cover 1152 includes a first end 1156 configured to be coupled to the glazing stop 1100 and a second end 1160 configured to be coupled to the frame 1224.

Figure 7:
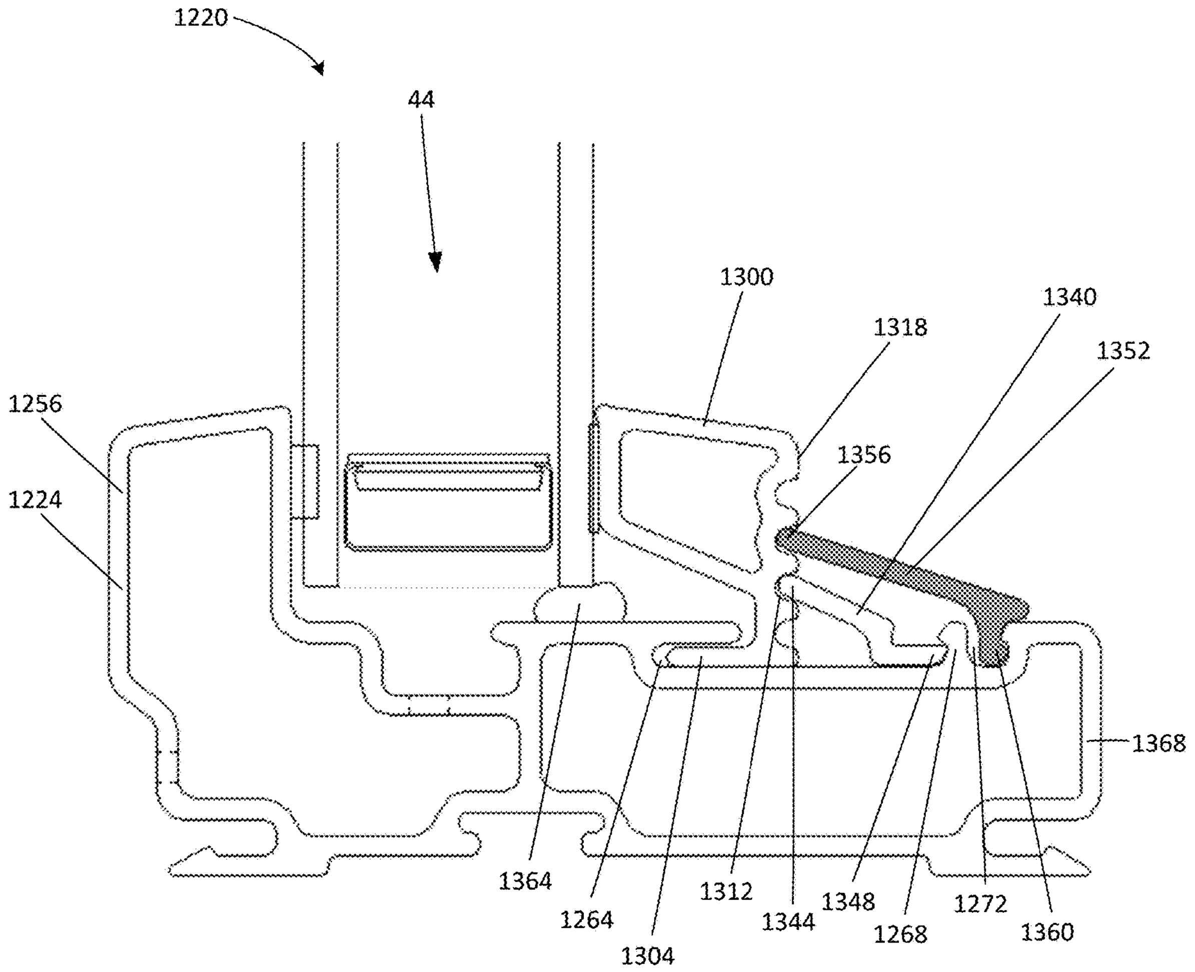
FIG. 7 shows a cross-sectional view of another fenestration unit including a glazing stop, according to some examples.

FIG. 7 shows a cross-sectional view of another fenestration unit 1220 including a glazing stop 1300, which may be substantially similar to fenestration unit 1020, other than the features noted below. As shown, the fenestration unit 1220 includes a frame 1224 having a frame profile 1256 defining a second profile section 1368, a glazing unit 44, the glazing stop 1300, a glazing retainer 1340, and a cover 1352. In various examples, the frame 1224 defines a first coupling element 1264 configured to secure the glazing stop 1300, a second coupling element 1268 configured to secure the glazing retainer 1340, and a third coupling element 1272 configured to secure the cover 1352. In some instances, the glazing stop 1300 defines a first coupling element 1304 configured to be coupled to the frame 1224, a second coupling element 1308 configured to be coupled to the cover 1352, and a third coupling element 1312 configured to secure the glazing retainer 1140. For example, the first coupling element 1304 of the glazing stop 1300 is configured to be coupled to the first coupling element 1264 of the frame 1224. In various examples, the second coupling element 1308 and the third coupling element 1312 are substantially similar (e.g., identical) and/or positioned side-by-side (e.g., on the second engagement face 1318). In certain instances, the glazing retainer 1340 has a first end 1344 and a second end 1348.

As shown in FIG. 7, the first end 1344 of the glazing retainer 1340 is configured to engage and/or be secured to the glazing stop 1300, such as by the third coupling element 1312. As illustrated, the second end 1348 is configured to engage and/or be secured to the frame 1224, such as by the second coupling element 1268. In various examples, when secured to the frame 1224, the glazing retainer 1340 urges the glazing stop 1300 towards the glazing unit 44 to secure the glazing unit. In various examples, the cover 1352 includes a first end 1356 configured to be coupled to the glazing stop 1300 and a second end 1360 configured to be coupled to the frame 1224. In some instances, the third sealing member 1364 couples and/or seals a gap between the glazing unit 44 and the frame 1224. In some examples, one or more of the coupling elements 1264, 1268, 1272, 1304, 1308, 1312 and/or one or more of the ends 1344, 1348, 1356, 1360 include a channel, a recess, a hook, a post, and/or a protrusion.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof.

What is claimed is:

1. A fenestration unit comprising:

a glazing unit having a peripheral edge region, a first side and a second side;

a frame defining a head, a sill, a first jamb and a second jamb, the frame having a frame profile defining a first coupling element and an engagement face to which the first side of the glazing unit is releasably coupled;

a glazing stop including a first coupling element and a first engagement face, wherein the first coupling element of the glazing stop is releasably coupled to the first coupling element of the frame, wherein the first engagement face of the glazing stop is releasably coupled to the second side of the glazing unit;

a first sealing member disposed between the first side of the glazing unit and the engagement face of the frame;

a second sealing member disposed between the second side of the glazing unit and the first engagement face of the glazing stop; and a third sealing member disposed between the frame and the glazing stop, wherein the third sealing member includes an adhesive side and a non-adhesive side.

2. The fenestration unit of claim 1, wherein the adhesive side of the third sealing member is adhesively coupled to the glazing stop.

3. The fenestration unit of claim 1, wherein the non-adhesive side of the third sealing member is non-adhesively coupled to the frame.

4. The fenestration unit of claim 1, wherein the adhesive side comprises a single-sided adhesive tape.

5. The fenestration unit of claim 1, wherein the non-adhesive side of the third sealing member comprises a foam material.

6. The fenestration unit of claim 5, wherein the foam material is air-permeable and/or moisture blocking.

7. The fenestration unit of claim 1, further comprising a fastener configured to couple the glazing stop to the frame.

8. The fenestration unit of claim 7, wherein the third sealing member is adjacent to the fastener.

9. A fenestration unit comprising:

a glazing unit having a peripheral edge region, a first side and a second side;

a frame defining a head, a sill, a first jamb and a second jamb, the frame having a frame profile defining a first coupling element and an engagement face to which the first side of the glazing unit is releasably coupled, wherein the first coupling element includes an opening extending along an axis;

a glazing stop including a first coupling element and a first engagement face, wherein the first coupling element of the glazing stop is releasably coupled to the first coupling element of the frame, and when releasably coupled to the first coupling element of the frame, a majority of the first coupling element of the glazing stop is parallel with the axis of the opening of the first coupling element of the frame, wherein the first engagement face of the glazing stop is releasably coupled to the second side of the glazing unit;

a first sealing member disposed between the first side of the glazing unit and the engagement face of the frame;

a second sealing member disposed between the second side of the glazing unit and the first engagement face of the glazing stop and;

a third sealing member disposed between the frame and the glazing stop, wherein the third sealing member is adhesively coupled to the glazing stop and non-adhesively coupled to the frame.

10. The fenestration unit of claim 9, wherein the third sealing member comprises at least one of a dry sealant bead, a weather-strip blub, or an adhesive tape.

11. The fenestration unit of claim 9, wherein the third sealing member comprises a foam material.

12. The fenestration unit of claim 11, wherein the foam material is air-permeable and/or moisture blocking.

13. A fenestration unit comprising:

a glazing unit having a peripheral edge region, a first side and a second side;

a frame defining a head, a sill, a first jamb and a second jamb, the frame having a frame profile defining a first coupling element and an engagement face to which the first side of the glazing unit is releasably coupled;

a glazing stop including a shielding portion, a first coupling element and a first engagement face, wherein the first coupling element of the glazing stop is releasably coupled to the first coupling element of the frame and wherein the first engagement face of the glazing stop is releasably coupled to the second side of the glazing unit;

a fastener configured to couple the glazing stop to the frame, the shielding portion substantially shielding the fastener from observation;

a first sealing member disposed between the first side of the glazing unit and the engagement face of the frame; and a second sealing member disposed between the second side of the glazing unit and the first engagement face of the glazing stop; and a third sealing member disposed between the frame and the glazing stop, wherein the third sealing member is adhesively coupled to the glazing stop and non-adhesively coupled to the frame.

14. The fenestration unit of claim 13, wherein the fastener is removable from the glazing stop and the frame.

15. The fenestration unit of claim 13, wherein the fastener extends through the first coupling element of the glazing stop.

16. The fenestration unit of claim 13, wherein the fastener is perpendicular to the first coupling element of the glazing stop.

17. The fenestration unit of claim 13, wherein the fastener is adjacent to the third sealing member.

18. The fenestration unit of claim 13, wherein the fastener is at a non-perpendicular angle relative to the first coupling element of the glazing stop.

19. The fenestration unit of claim 1, wherein the adhesive side comprises a dry sealant bead.

20. The fenestration unit of claim 1, wherein the adhesive side comprises a weather-strip blub.

* * * * *